(12) United States Patent
Cox et al.

(10) Patent No.: US 8,671,247 B2
(45) Date of Patent: Mar. 11, 2014

(54) TRANSFER OF BUS-BASED OPERATIONS TO DEMAND-SIDE MACHINES

(75) Inventors: Jason A. Cox, Raleigh, NC (US); Kevin C K Lin, Raleigh, NC (US); Eric F. Robinson, Raleigh, NC (US); Mark J. Wolski, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/967,086

(22) Filed: Dec. 14, 2010

(65) Prior Publication Data

US 2012/0151142 A1  Jun. 14, 2012

(51) Int. Cl.
*G06F 13/00* (2006.01)
(52) U.S. Cl.
USPC .......................................... 711/146; 710/107
(58) Field of Classification Search
USPC .......................................... 711/146; 710/107
See application file for complete search history.

(56) References Cited

U.S. PATENT DOCUMENTS

| 2006/0064518 A1* | 3/2006 | Bohrer et al. ............... 710/22 |
| 2009/0144505 A1* | 6/2009 | Auemhammer et al. ..... 711/128 |
| 2009/0319707 A1* | 12/2009 | Laycock et al. .............. 710/110 |
| 2010/0100683 A1 | 4/2010 | Guthrie et al. |
| 2010/0235576 A1 | 9/2010 | Guthrie et al. |
| 2010/0235586 A1 | 9/2010 | Gonion |

OTHER PUBLICATIONS

Tuck et al., "Scalable Cache Miss Handling for High Memory-Level Parallelism", University of Illinoise at Urbana-Champaign, The 39th Annual IEEE/AMC International Symposium on Microarchitecture (MICRO'06), 2006, 12 pages.

* cited by examiner

*Primary Examiner* — Jared Rutz
(74) *Attorney, Agent, or Firm* — Katherine S. Brown; Jeffrey L. Streets

(57) ABSTRACT

An L2 cache, method and computer program product for transferring an inbound bus operation to a processor side handling machine. The method includes a bus operation handling machine accepting the inbound bus operation received over a system interconnect, the bus operation handling machine identifying a demand operation of the processor side handling machine that will complete the bus operation, the bus operation handling machine sending the identified demand operation to the processor side handling machine, and the processor side handling machine performing the identified demand operation.

16 Claims, 3 Drawing Sheets

TRANSFER OF BUS-BASED OPERATIONS TO DEMAND-SIDE MACHINES

BACKGROUND

1. Field of the Invention

The present invention relates to the handling of bus operations in an L2 cache.

2. Background of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines stored at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol, MOESI (Modified, Owned, Exclusive, Shared, Invalid) protocol, or a variant thereof, and the coherency messages indicate a protocol-defined coherency state transition in the cache hierarchy of the requestor and/or the recipients of a memory access request. The MOESI protocol allows a cache line of data to be tagged with one of five states: "M" (Modified), "O" (Owned), "E" (Exclusive), "S" (Shared), or "I" (Invalid). The Modified state indicates that a memory block is valid only in the cache holding the Modified memory block and that the memory block is not consistent with system memory. Only one cache can hold a memory block in the Owned state, although other caches may hold the same memory block in the Shared state. When a coherency state is indicated as Exclusive, then, of all caches at that level of the memory hierarchy, only that cache holds the memory block. The data of the Exclusive memory block is consistent with that of the corresponding location in system memory, however. If a memory block is marked as Shared in a cache directory, the memory block is resident in the associated cache and either is or was at some point in time in at least one other cache at the same level of the memory hierarchy, and all of the copies of the coherency state are consistent with system memory. Finally, the Invalid state indicates that the data and address tag associated with a coherency state are both invalid.

The state to which each memory block (e.g., cache line or sector) is set is dependent upon both a previous state of the data within the cache line and the type of memory access request received from a requesting device (e.g., the processor). Accordingly, maintaining memory coherency in the system requires that the processors communicate messages via the system interconnect indicating their intention to read or write memory locations. For example, when a processor desires to write data to a memory location, the processor may first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some systems, the cache hierarchy includes multiple levels, with each lower level generally having successively longer access latency. Thus, a level one (L1) cache generally has lower access latency than a level two (L2) cache, which in turn has lower access latency than a level three (L3) cache. The level one (L1) or upper-level cache is usually a private cache associated with a particular processor core in a multiprocessor system. Because of the low access latencies of L1 caches, a processor core first attempts to service memory access requests in its L1 cache. If the requested data is not present in the L1 cache or is not associated with a coherency state permitting the memory access request to be serviced without further communication, the processor core then transmits the memory access request to one or more lower-level caches (e.g., level two (L2) or level three (L3) caches) for the requested data.

An L2 cache typically has a number of processor side handling machines to handle the demand operations (e.g., load, store, and fetch) that arrive from the processor(s) and thread(s). The processor side handling machines are often responsible for doing such things as searching the L2 cache data array, returning data/instructions for the sought after address, updating the L2 cache data array, and requesting data from memory or from the L3 cache if the sought after address does not exist in the L2 cache.

To implement a cache coherency protocol, each cache may broadcast a desired command or request onto the bus, and have each cache "snoop" and respond to the command based on it's line state. For example, consistent with the MOESI protocol, if Cache A is working on a Load and it does not have a copy of the desired cache line, then Cache A broadcasts a read request on the bus. Other caches and the memory controller receive the command, search their cache data array, and provide a response. If Cache B has the cache line in "Modified" state, then Cache B may provide a copy of the cache line with Cache A in a "Shared" state, while Cache B transitions its cache line to an "Owned" state.

BRIEF SUMMARY

One embodiment of the present invention provides a method, comprising a bus request handling machine accepting an inbound bus operation received over a system interconnect; the bus request handling machine identifying a demand operation of a processor side handling machine that will complete the bus operation; the bus request handling machine sending the identified demand operation to a processor side handling machine; and the processor side handling machine performing the identified demand operation.

Another embodiment of the present invention provides a computer program product including computer usable program code embodied on a computer usable storage medium.

The computer program product comprises computer usable program code for accepting an inbound bus operation received over a system interconnect; computer usable program code for identifying a demand operation of a processor side handling machine that will complete the bus operation; and computer usable program code for sending the identified demand operation to a processor side handling machine for execution.

A further embodiment of the present invention provides an L2 cache. The L2 cache comprises a cache data array, a processor side handling machine, and a bus operation handling machine. The processor side handling machine is operatively coupled to the cache data array and adapted for receiving demand operations from a processor, wherein the processor side handling machine can read and write to the cache data array. The bus operation handling machine is adapted for receiving bus operations over a system interconnect, wherein the bus operation handling machine is operatively coupled to the processor side handling machine, and wherein the bus operation handling machine includes logic for associating a bus operation with a demand operation for a processor side handling machine, and logic for sending the demand operation to the processor side handling machine for execution in response to receiving the associated bus operation.

DETAILED DESCRIPTION

Figure 1:
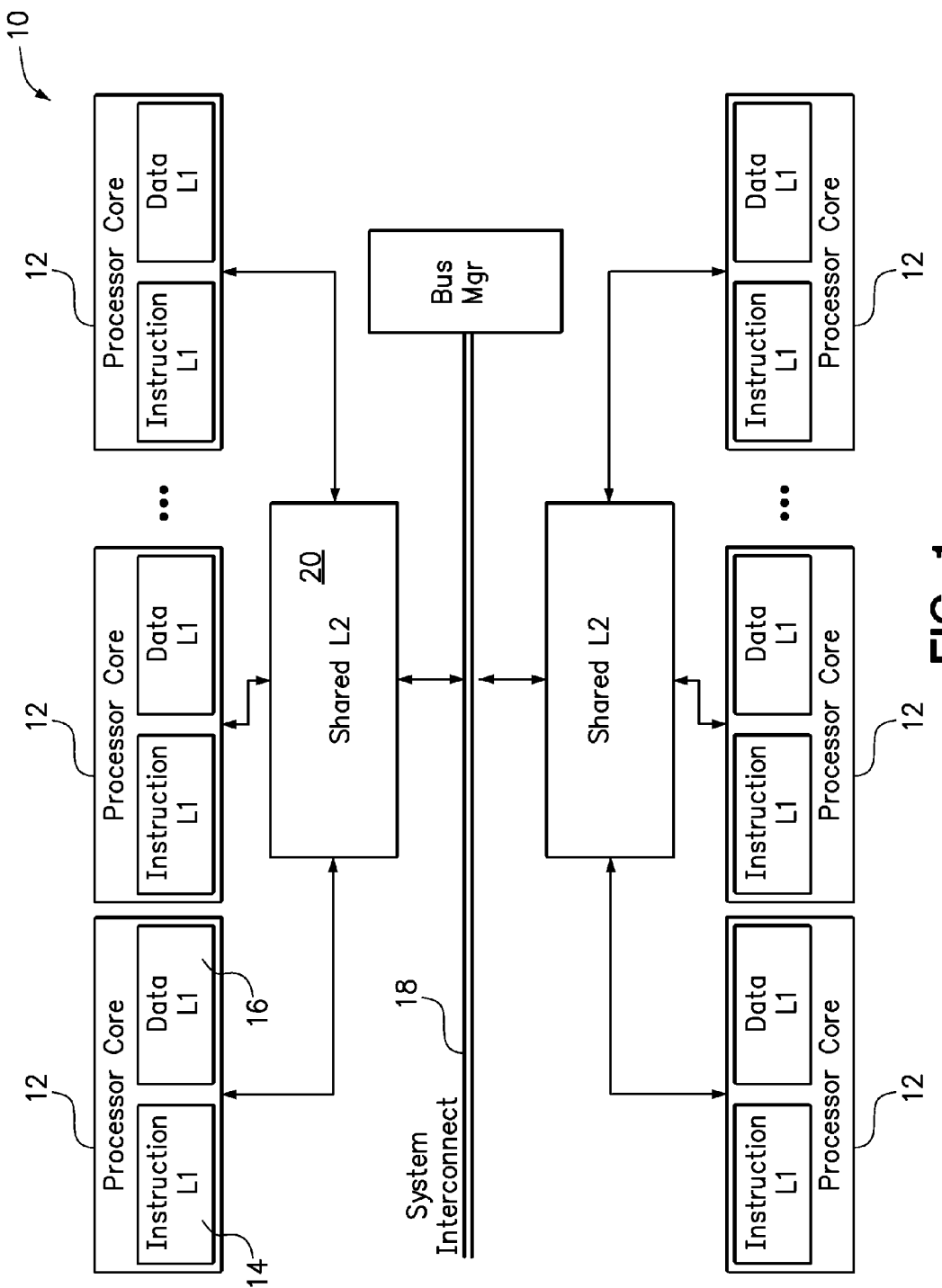
FIG. 1 is a diagram of a computer system having L2 cache operatively coupled to a system interconnect and shared by three processor cores.

One embodiment of the present invention provides a method, comprising a bus operation handling machine accepting an inbound bus operation received over a system interconnect; the bus operation handling machine identifying a demand operation of a processor side handling machine that will complete the bus operation; the bus operation handling machine sending the identified demand operation to a processor side handling machine; and the processor side handling machine performing the identified demand operation. The bus operation handling machine and the processor side handling machine are both elements on an L2 cache. The bus operation handling machine (BOHM) may alternatively be referred to as a Snoop machine (SNP), bus-side cache management logic, or Miss Status Holding Registers (MSHR). Similarly, the processor side handling machine (PSHM) may alternatively be referred to as a Read/Claim machine (RC), processor-side cache management logic, or demand-side machine.

Embodiments of the invention take a bus-based operation and convert it into a core-based operation using a standard function of the processor side handling machine to complete the operation. For example, a bus operation handling machine may receive a bus-based update injection, where the update injection is intended to update some of the bytes in a particular cache line. The bus operation handling machine may cause the processor side handling machine to perform an operation that looks like a demand store hit (i.e., the cache line is already in the cache and is merely updated). In another example, the bus operation handling machine may receive a bus-based install injection, where the install injection is intended to store data in a targeted cache line. Accordingly, the bus operation handling machine may cause the processor side handling machine to perform an operation that looks like a demand store miss (i.e., the cache line is not currently in the cache and needs to be installed there, even if this causes a victim line to be cast out of the cache to make room for the new line).

The processor side handling machine has various functions that it can perform in response to a core-based command or request. These functions include, without limitation, writing to the data cache array, sending data up to the core, or evicting a line from the cache to make room for a new line. Embodiments of the invention allow the bus operation handling machine to communicate with the processor side handling machine and utilize those functions to execute a bus-side operation. For example, significant additional logic would be necessary to allow a bus operation handling machine to directly perform a background kill (BKILL), which is a bus command which is sent out to invalidate a cache line). Rather, in accordance with one embodiment of the invention, the bus operation handling machine communicates with the processor side handling machine and causes the latter to execute an existing function to invalidate the cache line.

There are a variety of current or potential bus transactions which could benefit from gaining access to the functions that the processor side handling machine can already perform. Embodiments of the invention provide such access, such that these bus operations perform very similarly to existing core-based requests. Table 1, below, includes some additional, non-limiting examples of bus operations, the processor side handling machine functions that can be used to perform these bus operations, and the core-based operations they are similar to in how they perform those functions.

TABLE 1

| Bus Operation | Needed Demand-Side Function | Demand Operation Similar To |
|---|---|---|
| Full Line Cache Inject | Cache Data write | L2 Only Prefetch |
| Partial Cache Inject | Cache Data read modified write | Store Hit |
| Forced Cache Inject | Castout, Cache Data write | L2 Only Prefetch |
| Slave Write (full line) | Cache Data write | L2 Only Prefetch |
| Slave Write (partial line) | Cache Data read modified write | Store Hit |

The method may further comprise the bus operation handling machine sending a destination address for the data in the bus operation, such as a write request, to a device originating the bus operation, wherein the destination address is a machine identification (ID) for the processor side handling machine. It is not important whether the device originating the bus operation recognizes the ID as a processor-side machine, or simply reacts as though the ID is a buffer ID for the bus operation handling machine or a dedicated cache injection machine.

Still further, the method may further comprise the bus operation handling machine dispatching for the bus operation until the bus operation handling machine receives a coherence response from other bus operation handling machines in the system. The bus operation handling machine will preferably also protect the line during the handoff to the processor side handling machine, and then allow the processor side handling machine to protect the address. Where the bus operation is a write request, the method may further include writing the data into the cache array, and writing the address into a directory for the cache array.

It is possible that one or both of the processor side handling machines and the bus operation handling machines are able to perform Directory Writes and Back-Invalidates. It should be recognized that the directory is that portion of the cache that holds the addresses of the lines in the cache. Therefore, a Directory Hit or Miss refers to situations where the cache in question contains (i.e., hits) or does not contain (i.e., misses) a particular cache line.

Optionally, the bus operation handling machine sends the demand operation in the same format as a response to a command that the processor side handling machine has broadcast onto the bus. Accordingly, the demand operation may optionally be performed without the processor side handling machine recognizing that the operation did not come from the processor.

Still further, the processor side handling machine may be allowed to perform the demand operation on a resource that is not directly accessible to the bus operation handling machine. For example, in some L2 cache implementations, the bus operation handling machine may not have direct access to a write port into a cache data array.

In a multi-processor system, there are various reasons to inject data into the cache of a processor core. One specific example is that a co-processor out on the bus may choose to update an existing cache line or install specific data into a new cache line of another processor's cache so that the other processor can easily access the data without having to go out into memory to try to find the cache line. A data injection can be especially advantageous for message passing. Examples of this type of function in use are cache injects, and forced cache injects. Data injections may be useful to conserve memory bandwidth and reduce access latency by keeping data on-chip as much as possible as it is manipulated by various co-processors, such as encryption or compression engines.

A data injection may also be used to pass a message to a thread in the core. In accordance with one or more embodiment described herein, inbound data may be passed through the L2 cache attached to the destination thread's processor core. For this reason, the L2 cache nearest the destination thread needs to be able to receive data and pass it up to the core, preferably without putting the data into the L2 data array.

Slave memory is another feature that allows the cache to receive data from the bus. Slave memory is a portion or the entirety of a cache that has been configured to act as memory, or the lowest point of coherency for a set of data. This space could be set up to be cacheable or non-cacheable, but either way, the L2 slice has to be available to accept data writes from the bus in the form of non-cacheable stores in the non-cacheable version, or castout/push data in the case of the cacheable slave space.

Another embodiment of the present invention provides a computer program product including computer usable program code embodied on a computer usable storage medium. The computer program product comprises computer usable program code for accepting an inbound bus operation received over a system interconnect; computer usable program code for identifying a demand operation of a processor side handling machine that will complete the bus operation; and computer usable program code for sending the identified demand operation to a processor side handling machine for execution. It should be recognized that further embodiments of the computer program product may include computer usable program code for performing aspects of the methods described herein.

A further embodiment of the present invention provides an L2 cache. The L2 cache comprises a cache data array, a processor side handling machine, and a bus operation handling machine. The processor side handling machine is operatively coupled to the cache data array and adapted for receiving demand operations from a processor, wherein the processor side handling machine can read and write to the cache data array. The bus operation handling machine is adapted for receiving bus operations over a system interconnect, wherein the bus operation handling machine is operatively coupled to the processor side handling machine, and wherein the bus operation handling machine includes logic for associating a bus operation with a demand operation for a processor side handling machine, and logic for sending the demand operation to the processor side handling machine for execution in response to receiving the associated bus operation. In a first option, the cache data array is shared by two or more processors. In a separate option, the L2 cache is installed in a distributed shared memory system.

The bus operation handling machine of the L2 cache may send the demand operation in the same format as a response to a command that the processor side handling machine has broadcast onto the bus. In a separate aspect, the processor side handling machine performs the demand operation on a resource that is not directly accessible to the bus operation handling machine. For example, the indirect-access resource may be a write port to a cache data array.

FIG. 1 is a diagram of a computer system 10 having two L2 cache devices 20, each operatively coupled to a system interconnect 18 and shared by three processor cores 12. Each processor core 12 has an instruction L1 cache 14 for handling instructions in and out of the processor and a data L1 cache 16 for handling data in and out of the processor. A bus manager is also coupled to the bus 18 to manage traffic on the bus.

Figure 2:
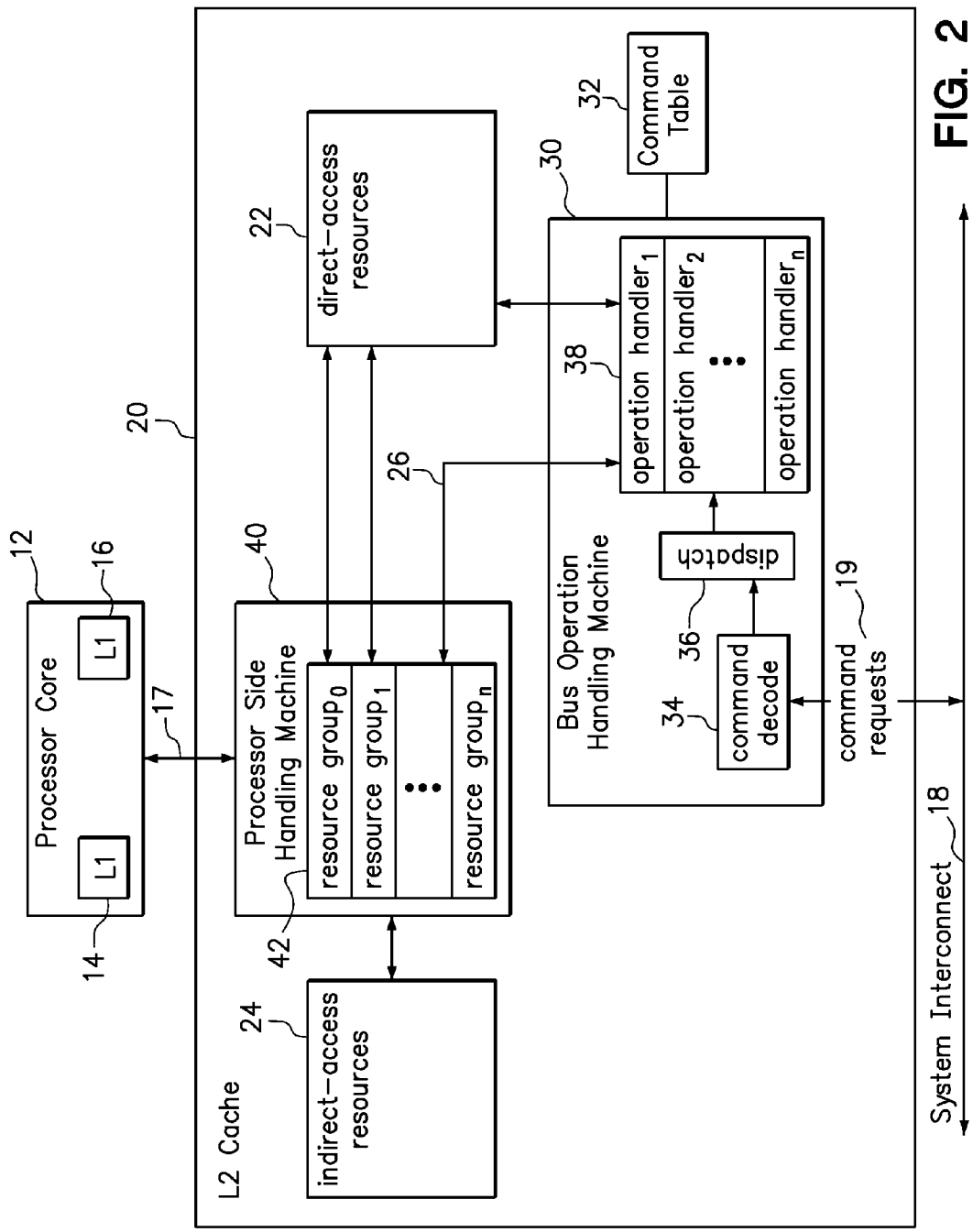
FIG. 2 is a diagram of an L2 cache from FIG. 1 showing a bus operation handling machine operatively coupled to a processor side handling machine.

FIG. 2 is a diagram of the L2 cache 20 from FIG. 1 showing a bus operation handling machine 30 operatively coupled via internal link 26 to a processor side handling machine 40. Direct-access resources 22 are those components or portions of components that are accessible to both the bus operation handling machine 30 and the processor side handling machine 40. In some embodiments, the direct-access resources might include a read function of the cache data array, including the directory to the cache data array. Indirect-access resources are available only through the processor side handling machine 40 and are "indirect-access" from the perspective of the bus operation handling machine 30.

The processor side handling machine 40 receives demand-side requests from the processor core 12 via a processor link 17, perhaps including one of the L1 cache 14, 16. Conversely, the bus operation handling machine 30 receives bus-side requests or operations from the system interconnect/bus 18 via a bus link 19. The internal link 26 allows the bus operation handling machine 30, in accordance with the present invention, to communicate with the processor side handling machine 40 in order to gain use of the processor side handling machine 40 in executing a bus operation. In particular, the processor side handling machine 40 has various built-in functions and connections that are not directly accessible to the bus operation handling machine 30.

In operation according to one embodiment, the bus operation handling machine 30 receives a bus operation via the bus link 19. The command decode unit 34 decodes the command, does a directory lookup to determine whether or not there is a cache hit, and, if so, identifies the state of the cache line. The dispatch unit 36 is responsible for providing the necessary bus operation handler 38 (1-$n$) to handle the bus operation. If the command decode unit 34 determines that the bus operation handling machine 30 (including snoop logic) is unable to complete the bus operation on its own, then it may request the assistance of the processor side handling machine 40. To do so, the bus command decode unit 34 searches a command table 32 for the current bus operation and then sends the associated demand-side function to the dispatch unit 36 which sends the operation to a selected one of the operation handlers 38. One of the operation handlers 38 then send a demand-side command request to the processor side handling machine 40. Optionally, the command table may provide a template for the demand-side function request, including any operand(s) or other value(s). A preferred template will form the demand-side function request such that the processor side handling machine 40 (via one of the resource groups 42) receives the request in the same manner as it would receive either a response to its own bus operation or a command from the processor core. Other entities on the system interconnect 18 may originate the bus operation and may then receive a reply from the bus operation handling machine 30, such as an ID for the processor side handling machine 40 that will complete the bus operation.

Figure 3:
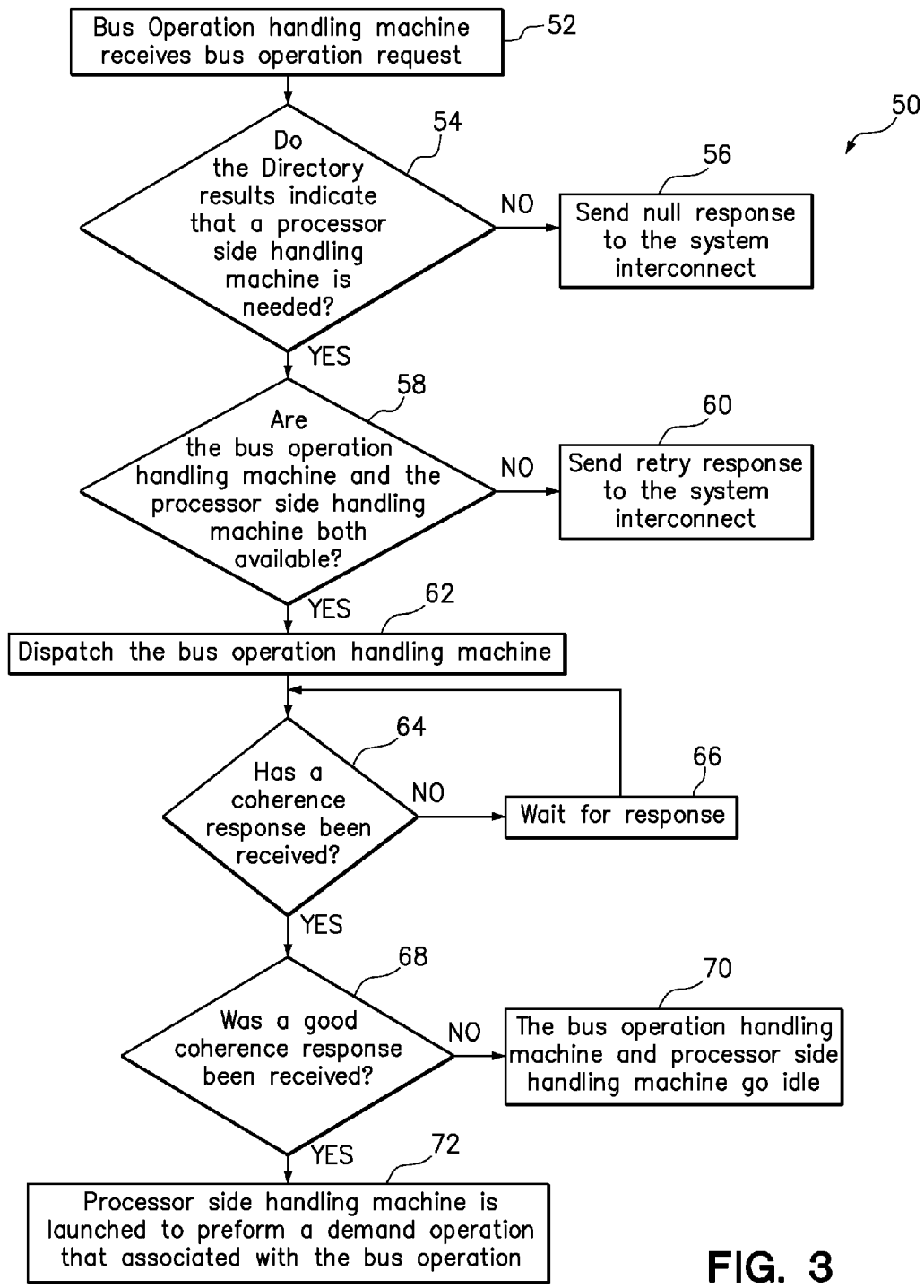
FIG. 3 is a flowchart of a process according to one embodiment of the invention.

FIG. 3 is a flowchart of a process 50 according to one embodiment of the invention. In step 52, a bus operation handling machine receives a bus operation. If, in step 54, directory results indicate that a process side handling machine is not needed to complete the bus operation, then step 56 sends a null response to the system interconnect. If step 54 determines that a processor side handling machine is needed, then step 58 determines whether the bus operation handling machine and the processor side handling machine are both available. If both machines are not available, then step 60 sends a retry response to the system interconnect. If both machines are available, then the bus operation handling machine is dispatched in step 62.

In step 64, if a coherence response (CRESP) has not been received, then, in step 66, the process waits for a response. When a coherence response has been received, the step 68 determines that the coherence response is not good, then the bus operation handling machine and the processor side handling machine go idle in step 70. If step 68 determines that a good coherence response has been received, then in step 72 a processor side handling machine (one of the resource groups 0-n) is launched to perform a demand operation associated with the bus operation. Such an association may be maintained by storing the bus operation and the demand operation in a common row of a command table, such as table 32 of FIG. 2. A more specific example of table 32 is set out above in Table 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for transferring an inbound bus operation to a processor side handling machine, comprising:
   a bus operation handling machine accepting the inbound bus operation received over a system interconnect, wherein the inbound bus operation is a write request;
   the bus operation handling machine sending a destination address for the data in the write request to a device originating the write request, wherein the destination address is a machine identification for the processor side handling machine;
   the bus operation handling machine identifying a demand operation of the processor side handling machine that will complete the bus operation;
   the bus operation handling machine sending the identified demand operation to the processor side handling machine; and
   the processor side handling machine performing the identified demand operation.

2. The method of claim 1, wherein the write request received by the bus operation handling machine is an update injection.

3. The method of claim 2, wherein the processor side handling machine completes the write request as a demand store hit.

4. The method of claim 1, wherein the write request received by the bus operation handling machine is an install injection.

5. The method of claim 4, wherein the processor side handling machine completes the write request as a demand store miss.

6. The method of claim 1, further comprising:
   the bus operation handling machine waiting to dispatch the write request until the bus operation handling machine receives a coherence response from a bus controller.

7. The method of claim 1, wherein the processor side handling machine performs the demand operation on a resource that is not directly accessible to the bus operation handling machine.

8. The method of claim 7, wherein the resource is a write port to a cache data array.

9. A method for transferring an inbound bus operation to a processor side handling machine, comprising:
   a bus operation handling machine accepting the inbound bus operation received over a system interconnect, wherein the inbound bus operation is a write request;
   the bus operation handling machine identifying a demand operation of the processor side handling machine that will complete the bus operation;
   the bus operation handling machine protecting an address in a cache array while the write request is being passed to the processor side handling machine;
   the bus operation handling machine sending the identified demand operation to the processor side handling machine;
   after the processor side handling machine receives the write request, the processor side handling machine protecting the address in the cache array; and
   the processor side handling machine performing the identified demand operation.

10. The method of claim 9, further comprising:
    writing the data into the cache array; and
    writing the address into a directory for the cache array.

11. A method for transferring an inbound bus operation to a processor side handling machine, comprising:
    a bus operation handling machine accepting the inbound bus operation received over a system interconnect, wherein the inbound bus operation is a write request;
    the bus operation handling machine sending a destination address for the data in the write request to a device originating the write request, wherein the destination address is a machine identification for the processor side handling machine;
    the bus operation handling machine identifying a demand operation of the processor side handling machine that will complete the bus operation;
    the bus operation handling machine sending the identified demand operation to the processor side handling machine, wherein the bus operation handling machine sends the demand operation in the same format as a response to a command that the processor side handling machine has broadcast onto the bus; and
    the processor side handling machine performing the identified demand operation.

12. An L2 cache, comprising:
a cache data array;
a processor side handling machine operatively coupled to the cache data array and adapted for receiving demand operations from a processor, wherein the processor side handling machine can read and write to the cache data array; and
a bus operation handling machine adapted for receiving bus operations over a system interconnect, wherein the bus operation handling machine is operatively coupled to the processor side handling machine, and wherein the bus operation handling machine includes logic for associating a bus operation with a demand operation for a processor side handling machine, and logic for sending the demand operation to the processor side handling machine for execution in response to receiving the associated bus operation, and wherein the bus operation handling machine sends the demand operation in the same format as a response to a command that the processor side handling machine has broadcast onto the bus.

13. The L2 cache of claim 12, wherein the processor side handling machine performs the demand operation on a resource that is not directly accessible to the bus operation handling machine.

14. The L2 cache of claim 12, wherein the resource is a write port to a cache data array.

15. The L2 cache of claim 12, wherein the cache data array is shared by two or more processors.

16. The L2 cache of claim 12, wherein the L2 cache is installed in a distributed shared memory system.

* * * * *